United States Patent
Broyde et al.

(10) Patent No.: US 8,902,998 B2
(45) Date of Patent: Dec. 2, 2014

(54) RECEIVER FOR NEAR-FIELD CHIP-TO-CHIP MULTICHANNEL TRANSMISSION

(75) Inventors: Frederic Broyde, Maule (FR); Evelyne Clavelier, Maule (FR)

(73) Assignee: Apple Inc., Cupertino, CA (US)

(*) Notice: Subject to any disclaimer, the term of this patent is extended or adjusted under 35 U.S.C. 154(b) by 95 days.

(21) Appl. No.: 13/807,941

(22) PCT Filed: May 24, 2011

(86) PCT No.: PCT/IB2011/052253
§ 371 (c)(1),
(2), (4) Date: Apr. 17, 2013

(87) PCT Pub. No.: WO2012/001545
PCT Pub. Date: Jan. 5, 2012

(65) Prior Publication Data
US 2013/0215980 A1  Aug. 22, 2013

(30) Foreign Application Priority Data
Jul. 2, 2010  (FR) ..................................... 10 02802

(51) Int. Cl.
*H04L 27/00* (2006.01)
*H04B 5/00* (2006.01)
*H04B 5/02* (2006.01)

(52) U.S. Cl.
CPC ............ *H04B 5/0087* (2013.01); *H04B 5/0025* (2013.01); *H04B 5/0056* (2013.01); *H04B 5/02* (2013.01)
USPC ............. 375/256; 375/316; 375/346; 330/84; 330/147; 330/148

(58) Field of Classification Search
CPC ..................................................... H04B 5/0087
USPC .............. 375/256, 316, 346; 455/63.1, 67.13, 455/114.2, 296, 501; 327/551; 330/84, 147, 330/148
See application file for complete search history.

(56) References Cited

FOREIGN PATENT DOCUMENTS

| | | |
|---|---|---|
| FR | 2933556 | 1/2010 |
| WO | 2010/004442 | 1/2010 |
| WO | 2010/004448 | 1/2010 |

OTHER PUBLICATIONS

International Search Report for PCT/IB2011/052253, mailed Aug. 4, 2011.
International Preliminary Report on Patentability for PCT/IB2011/052253, mailed Jan. 8, 2013.

*Primary Examiner* — Leon Flores
(74) *Attorney, Agent, or Firm* — Paradigm IP Law, PC; Ross L. Franks (57) ABSTRACT

The invention relates to a receiver for a near-field chip-to-chip multichannel transmission system such as the capacitive or inductive links used for vertical signal transmission between the stacked chips of a system-in-package. A receiver for near-field chip-to-chip multichannel transmission providing 4 transmission channels for digital transmission between two monolithic integrated circuits comprises 4 coupling devices (211) (212) (213) (214), each of said coupling devices being a planar winding sensitive to magnetic field variations. A multiple-input-port and multiple-output-port amplifier (23) has 4 input ports, each of said input ports being connected to one and only one of said coupling devices (211) (212) (213) (214). The receiver also comprises 4 recovery circuits (281) (282) (283) (284), each of said recovery circuits having an input port connected to one of the output ports of the multiple-input-port and multiple-output-port amplifier (23), each of said recovery circuits having an output terminal connected to the user (29). The receiver of the invention reduces crosstalk between the transmission channels.

10 Claims, 5 Drawing Sheets

Prior Art
FIG. 1

Prior Art

FIG. 2

Prior Art

RECEIVER FOR NEAR-FIELD CHIP-TO-CHIP MULTICHANNEL TRANSMISSION

CLAIM OF PRIORITY

This application claims the benefit of priority from commonly-owned P.C.T. Patent Application No. PCT/IB2011/052253, entitled "Receiver for Near-Field Chip-to-Chip Multichannel Transmission" and having an International filing date of May 24, 2011 (published on Jan. 5, 2012 as WO 2012/001545), which claims the benefit of priority from France Patent Application Serial No. 10/02802 entitled "Recepteur pour transmission multivoie puce-a-puce en champ proche" and filed on Jul. 2, 2010 (published on Jan. 6, 2012 as FR 2962275, and granted on Jul. 20, 2012), both of which are fully incorporated herein by reference for all purposes.

FIELD OF THE INVENTION

The invention relates to a receiver for a near-field chip-to-chip multichannel transmission system such as the capacitive or inductive links used for vertical signal transmission between the stacked chips of a system-in-package (SiP) using three-dimensional (3-D) integration.

The French patent application number 10/02802 of 2 Jul. 2010, entitled "Recepteur pour transmission multivoie puce-a-puce en champ proche" is incorporated by reference.

PRIOR ART

Three-dimensional integration is a new technology that enables an effective integration of complex systems. In a package using three-dimensional integration, chips may be stacked and structurally combined. In such a system-in-package, the vertical distance for signal transmission between two chips is typically smaller than 200 μm. Many vertical chip-to-chip transmission techniques have been developed. Techniques using through-silicon vias (TSVs) are expensive due to the increase of manufacturing process complexity. Techniques using near-field chip-to-chip transmission do not increase the process complexity.

Figure 1:
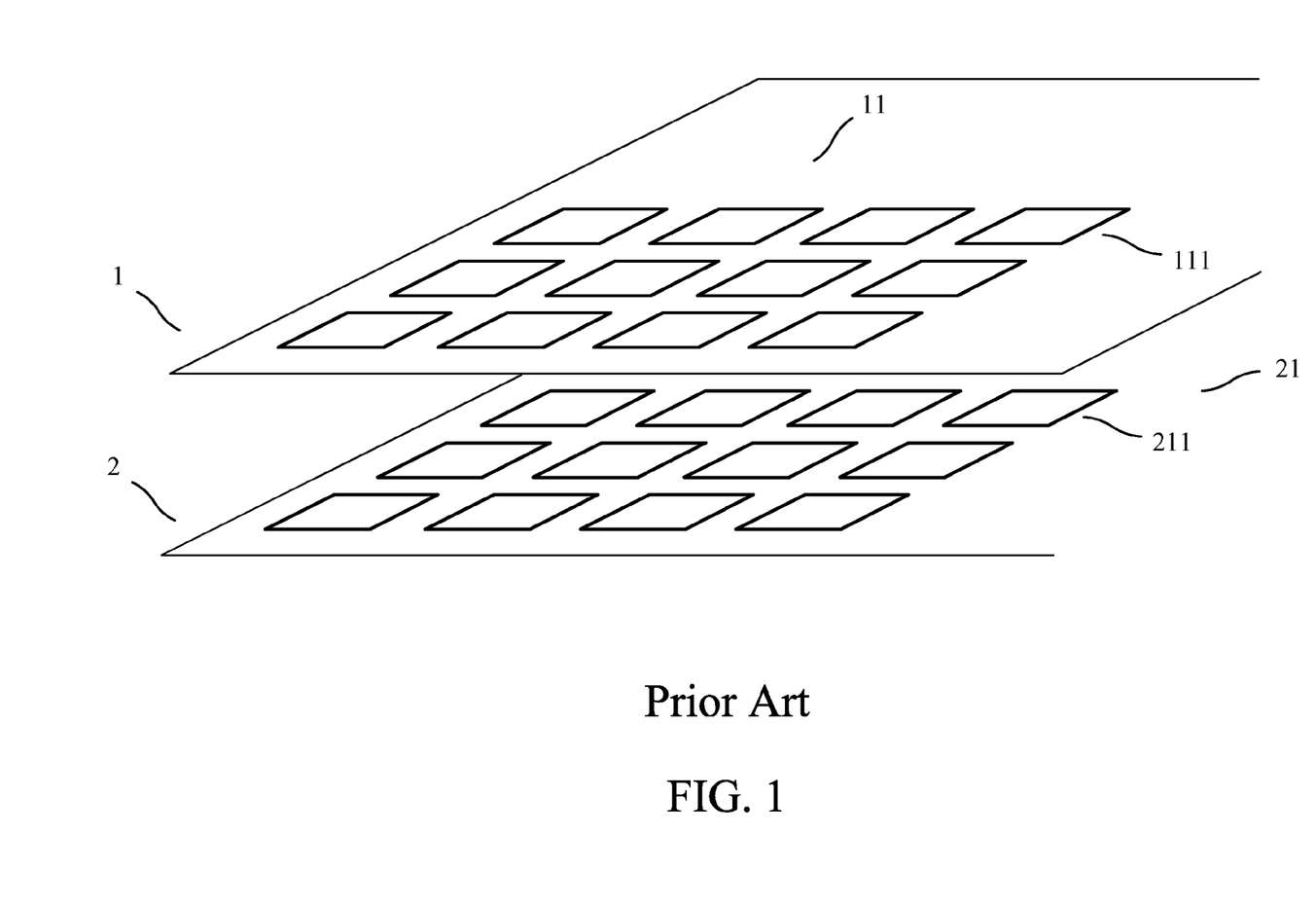
FIG. 1 shows the coupling devices of a near-field chip-to-chip multichannel transmission system, and has already been discussed in the section dedicated to the presentation of prior art.

The FIG. 1 shows the coupling devices of a near-field chip-to-chip multichannel transmission system providing m=12 transmission channels between a first monolithic integrated circuit (1) and a second monolithic integrated circuit (2), the near-field chip-to-chip multichannel transmission system comprising: a first array of coupling devices (11) built in a metallization level of the first monolithic integrated circuit (1), a coupling device (111) of the first array of coupling devices (11) being sensitive to electric field variations and/or to magnetic field variations, the first array of coupling devices (11) consisting of m coupling devices; a second array of coupling devices (21) built in a metallization level of the second monolithic integrated circuit (2), a coupling device (211) of the second array of coupling devices (21) being sensitive to electric field variations and/or to magnetic field variations, the second array of coupling devices (21) consisting of m coupling devices, a coupling device (211) of the second array of coupling devices (21) facing a single coupling device (111) of the first array of coupling devices (11).

A coupling device sensitive to electric field variations, for instance a conducting surface having a sufficient area (referred to as a capacitor plate by some authors), can be used for receiving an electric field used for signal transmission and can also be used for sending an electric field used for signal transmission. A coupling device sensitive to magnetic field variations, for instance a winding (referred to as coil or inductor by some authors), can be used for receiving a magnetic field used for signal transmission and can also be used for sending a magnetic field used for signal transmission. More generally, a coupling device may be any device sensitive to electric field variations and/or to magnetic field variations, for instance a device comprising a combination of conducting surfaces and/or of windings.

Figure 2:
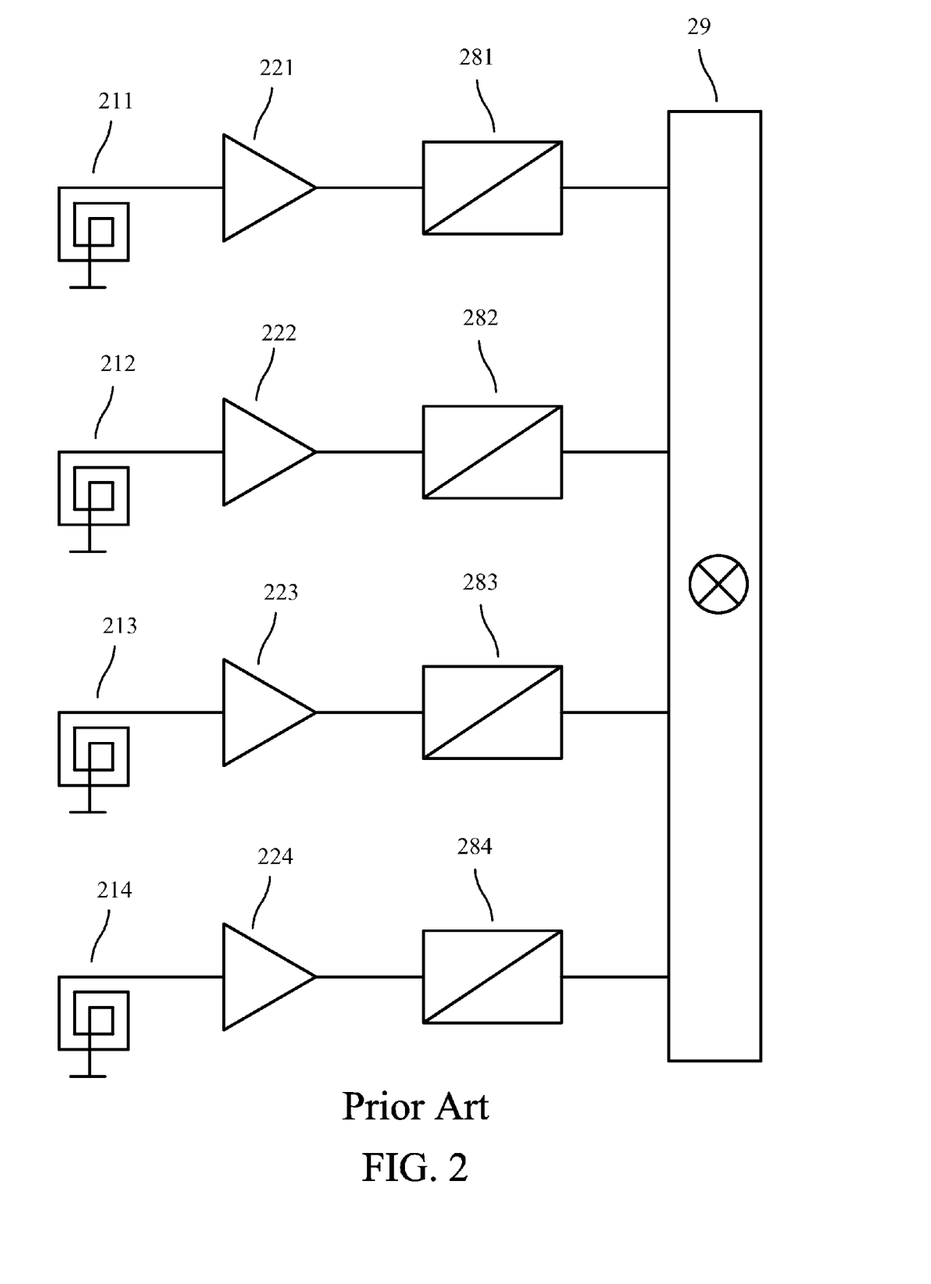
FIG. 2 shows the block-diagram of a first example of a receiver for a near-field chip-to-chip multichannel transmission system, and has already been discussed in the section dedicated to the presentation of prior art.

The FIG. 2 shows the block-diagram of a first example of a receiver of a near-field multichannel transmission system providing m=4 transmission channels for digital transmission between two monolithic integrated circuits, comprising: m coupling devices (211) (212) (213) (214), each of said coupling devices being a planar winding sensitive to magnetic field variations, each of said coupling devices having a grounded terminal; m single-ended amplifiers (221) (222) (223) (224), each of said single-ended amplifiers having an input port connected to one and only one of said coupling devices (211) (212) (213) (214); m recovery circuits (281) (282) (283) (284), each of said recovery circuits having an input port connected to the output port of one and only one of said single-ended amplifiers (221) (222) (223) (224), each of said recovery circuits having an output port connected to the user (29).

Figure 3:
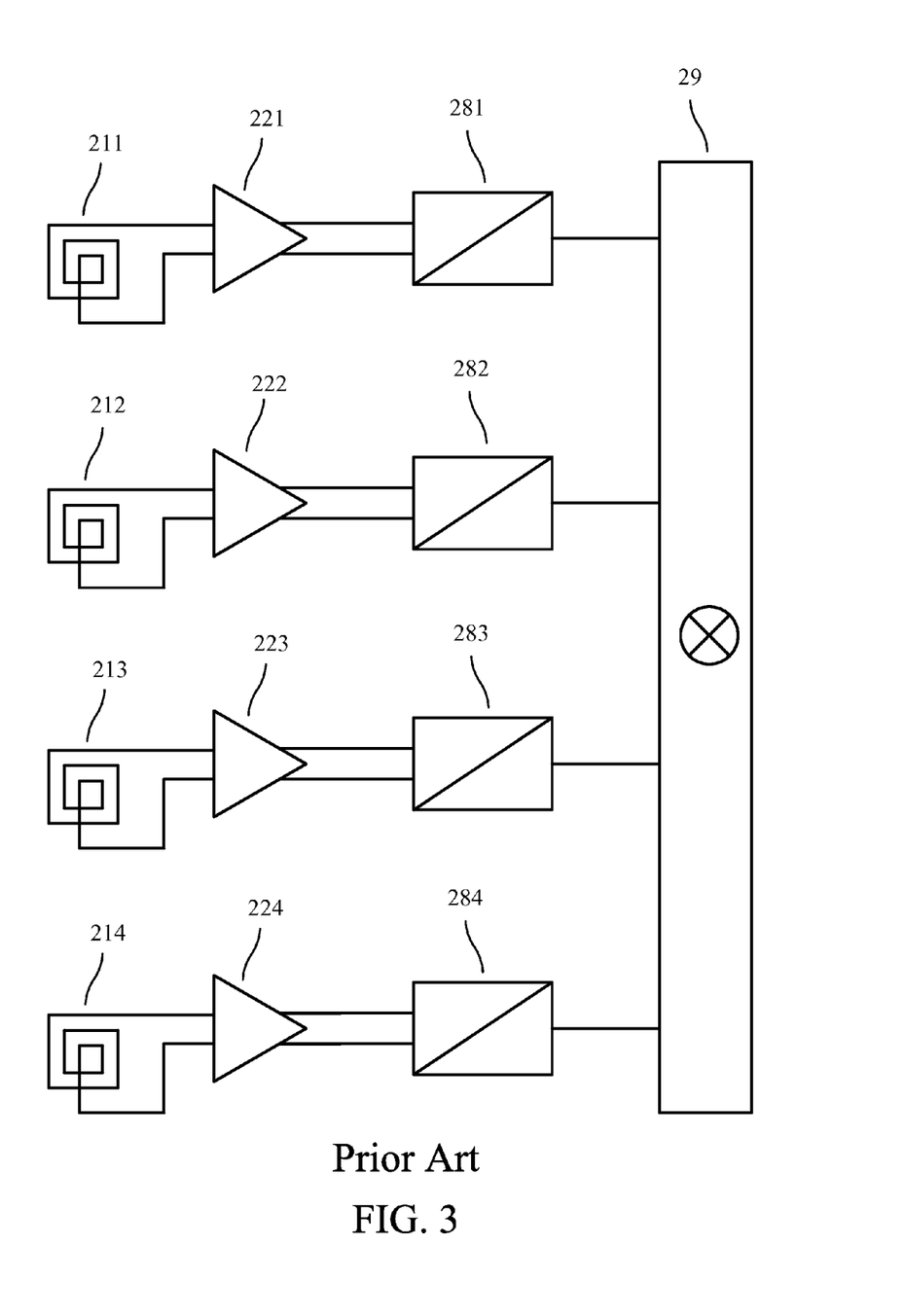
FIG. 3 shows the block-diagram of a second example of a receiver for a near-field chip-to-chip multichannel transmission system, and has already been discussed in the section dedicated to the presentation of prior art.

The FIG. 3 shows the block-diagram of a second example of a receiver of a near-field multichannel transmission system providing m=4 transmission channels for digital transmission between two monolithic integrated circuits, comprising: m coupling devices (211) (212) (213) (214), each of said coupling devices being a planar winding sensitive to magnetic field variations; m differential amplifiers (221) (222) (223) (224), each of said differential amplifiers having an input port connected to one and only one of said coupling devices (211) (212) (213) (214); m recovery circuits (281) (282) (283) (284), each of said recovery circuits having an input port connected to the output port of one and only one of said differential amplifiers (221) (222) (223) (224), each of said recovery circuits having an output port connected to the user (29).

In the FIGS. 2 and 3, a recovery circuit delivers the wanted digital signals. A recovery circuit can use different types of circuits according to the chosen signaling technique. For instance, a recovery circuit may be an integrator, a Schmitt trigger, a latch, a combination of such circuits or a more complex device suitable for recovering the digital signals. The enable and/or clock and/or control lines which may be necessary for the operation of the recovery circuits are not shown in the FIGS. 2 and 3.

Even though each coupling device may be considered as an electrically small antenna in the meaning of antenna theory, it is important to note that, in a near-field chip-to-chip multichannel transmission system, an array of coupling devices is not used as an array of antennas in the meaning of antenna theory. This is because the array of coupling devices operates in a near-field transmission system in which the electric and magnetic fields decrease very rapidly with distance. Thus, in an ideal case, a coupling device used for receiving an electric field or a magnetic field only senses the electric field or magnetic field variations produced by the nearest coupling device used for sending an electric field or a magnetic field. For instance, in FIG. 1 where a coupling device (211) of the second array of coupling devices (21) faces a single coupling device (111) of the first array of coupling devices (11), it is possible that signal transmission mainly occurs between coupling devices facing each other, either from the first monolithic integrated circuit (1) to the second monolithic integrated circuit (2), or from the second monolithic integrated circuit (2) to the first monolithic integrated circuit (2).

However, some unwanted couplings unavoidably occur, which produce crosstalk between the transmission channels. Unfortunately, this internal crosstalk limits the number of channels which can be used in a given area. This internal crosstalk has three causes:—a coupling device of one of the arrays of coupling devices may be significantly coupled with more than one coupling device of the other array of coupling devices, because signal transmission does not only occur between coupling devices facing each other;—the coupling devices of the first array of coupling devices interact;—the coupling devices of the second array of coupling devices interact.

For instance, the article of A. Fazzi, L. Magagni, M. Mirandola, B. Charlet, L. Di Cioccio, E. Jung, R. Canegallo and R. Guerrieri entitled "3-D Capacitive Interconnections for Wafer-Level and Die-Level Assembly" published in the *IEEE Journal of Solid-State Circuits*, vol. 42, No. 10, pp. 2270-2282 in October 2007 relates to a near-field chip-to-chip multichannel transmission system using electric field variations for signal transmission. This paper discusses crosstalk between the transmission channels.

For instance, the article of Y. Yoshida, N. Miura and Tadahiro Kuroda entitled "A 2 Gb/s Bi-Directional Inter-Chip Data Transceiver With Differential Inductors for High Density Inductive Channel Array" published in the *IEEE Journal of Solid-State Circuits*, vol. 43, No. 11, pp. 2363-2369 in November 2008 relates to a near-field chip-to-chip multichannel transmission system using magnetic field variations for signal transmission. This paper stresses the detrimental effects of crosstalk and introduces the use of special windings, referred to as "differential inductors", for reducing crosstalk. Unfortunately, such special windings produce a lower wanted coupling for a given area and provide only a partial reduction of crosstalk.

SUMMARY OF THE INVENTION

The purpose of the invention is a receiver for near-field chip-to-chip multichannel transmission which overcomes the above-mentioned limitations of known techniques.

According to the invention, a receiver of a near-field multichannel transmission system providing m transmission channels each corresponding to a signal to be sent from a first monolithic integrated circuit to a second monolithic integrated circuit, where m is an integer greater than or equal to 2, the first monolithic integrated circuit and the second monolithic integrated circuit being structurally combined, comprises: n coupling devices built in the second monolithic integrated circuit, where n is an integer greater than or equal to m, each of said coupling devices being sensitive to electric field variations and/or to magnetic field variations; a multiple-input-port and multiple-output-port amplifier, said multiple-input-port and multiple-output-port amplifier being built in the second monolithic integrated circuit, said multiple-input-port and multiple-output-port amplifier having n input ports and m output ports, each of said input ports being connected to one and only one of said coupling devices, each of said coupling devices being connected to one and only one of said input ports, said multiple-input-port and multiple-output-port amplifier having, when said multiple-input-port and multiple-output-port amplifier is in the activated state, for small signals, at each frequency in a frequency band used for transmission, a short-circuit transfer admittance matrix, said short-circuit transfer admittance matrix being a complex matrix of size m×n, two or more entries of each row of said short-circuit transfer admittance matrix being different from zero.

Let us number, from 1 to n, the input ports of the multiple-input-port and multiple-output-port amplifier. Any integer j greater than or equal to 1 and less than or equal to n corresponds to the number of an input port of the multiple-input-port and multiple-output-port amplifier. Let us define the input current $i_{Ij}$ flowing into the positive terminal of the input port j, and the input voltage $v_{Ij}$ between the positive terminal of the input port j and the negative terminal of the input port j. We also define the column-vector $I_I$ of the input currents $i_{I1}, \ldots i_{In}$ and the column-vector $V_I$ of the input voltages $v_{I1}, \ldots, v_{In}$. Let us number, from 1 to m, the output ports of the multiple-input-port and multiple-output-port amplifier. Any integer k greater than or equal to 1 and less than or equal to m corresponds to the number of an output port of the multiple-input-port and multiple-output-port amplifier. Let us define the output current $i_{Ok}$ flowing into the positive terminal of the output port k, and the output voltage $v_{Ok}$ between the positive terminal of the output port k and the negative terminal of the output port k. We also define the column-vector $I_O$ of the output currents $i_{O1}, \ldots, i_{Om}$ and the column-vector $V_O$ of the output voltages $v_{O1}, \ldots v_{Om}$. When the multiple-input-port and multiple-output-port amplifier is in the activated state, for small signals, the multiple-input-port and multiple-output-port amplifier is characterized, in frequency domain, by the two following equations:

$$I_I = Y_I V_I + Y_R V_O \quad (1)$$

$$I_O = Y_T V_I + Y_O V_O \quad (2)$$

where $Y_I$ is a square n×n matrix, where $Y_O$ is a square m×m matrix, where $Y_R$ is a n×m matrix and where $Y_T$ is a m×n matrix. All components of these matrices have the dimensions of admittance. Consequently, specialists understand that they can refer to $Y_I$ as the "short-circuit input admittance matrix" of the amplifier, to $Y_R$ as the "short-circuit reverse transfer admittance matrix" of the amplifier, to $Y_T$ as the "short-circuit transfer admittance matrix" of the amplifier, and to $Y_O$ as the "short-circuit output admittance matrix" of the amplifier. These four matrices have complex components and may be frequency-dependent.

According to the invention, two or more entries of each row of said short-circuit transfer admittance matrix may be significantly different from zero. For instance, said multiple-input-port and multiple-output-port amplifier may be such that, at each frequency in said frequency band used for transmission, in each row of said short-circuit transfer admittance matrix, at least one entry different from an entry having the largest absolute value has an absolute value greater than 1/100 times the absolute value of the entry having the largest absolute value. For instance, said multiple-input-port and multiple-output-port amplifier may be such that, at each frequency in said frequency band used for transmission, in each row of said short-circuit transfer admittance matrix, at least one entry different from an entry having the largest absolute value has an absolute value greater than 1/10 times the absolute value of the entry having the largest absolute value.

In the following, the wordings "is in the deactivated state" and "is not in the activated state" are equivalent.

According to the invention, the multiple-input-port and multiple-output-port amplifier in the activated state has, for small signals, at each frequency in a frequency band used for transmission, a short-circuit transfer admittance matrix, said short-circuit transfer admittance matrix being a complex matrix of size m×n, two or more entries of each row of said short-circuit transfer admittance matrix being significantly different from zero. According to the invention, it is possible that there is a deactivated state of the multiple-input-port and multiple-output-port amplifier, in which the behavior of the multiple-input-port and multiple-output-port amplifier is different. However, the existence of a deactivated state of the multiple-input-port and multiple-output-port amplifier is not at all a characteristic of the invention.

According to the invention, said n coupling devices built in the second monolithic integrated circuit are used for receiving an electric field or a magnetic field, as parts of a near-field transmission system providing m transmission channels each corresponding to a signal to be sent from the first monolithic integrated circuit to the second monolithic integrated circuit. Said n coupling devices built in the second monolithic integrated circuit can also be used for sending an electric field or a magnetic field, as parts of a near-field transmission system providing one or more transmission channels each corresponding to a signal to be sent from the second monolithic integrated circuit to the first monolithic integrated circuit. Thus, a bidirectional transmission is obtained. The specialist understands how this result can be obtained, for instance using controlled analog switches and/or a deactivated state of the multiple-input-port and multiple-output-port amplifier.

According to the invention, the first monolithic integrated circuit and the second monolithic integrated circuit are structurally combined, so that the first and second monolithic integrated circuits have fixed relative positions. The specialist understands that this requirement allows the designer to compute the effects of the three above-mentioned causes of internal crosstalk, and to determine a set of short-circuit transfer admittance matrices which can each cancel internal crosstalk at the output ports of the multiple-input-port and multiple-output-port amplifier.

According to the invention, at least one other monolithic integrated circuit can be structurally combined with the first monolithic integrated circuit and/or the second monolithic integrated circuit. In this case:—the receiver of the invention can also be used as a part of a near-field transmission system providing one or more transmission channels each corresponding to a signal to be sent from said at least one other monolithic integrated circuit to the second monolithic integrated circuit;—the n coupling devices built in the second monolithic integrated circuit can also be used for sending an electric field or a magnetic field, as parts of a near-field transmission system providing one or more transmission channels each corresponding to a signal to be sent from the second monolithic integrated circuit to said at least one other monolithic integrated circuit.

According to the invention, the multiple-input-port and multiple-output-port amplifier may for instance be such that the negative terminals of its input ports and/or of its output ports correspond to ground, such ports being single-ended in this case.

According to the invention, the multiple-input-port and multiple-output-port amplifier may for instance be such that each of its input ports corresponds to a differential input and/or such that each of its output ports corresponds to a differential output.

According to the invention, the multiple-input-port and multiple-output-port amplifier may comprise a multiple-input and multiple-output series-series feedback amplifier, for instance described in the French patent application number 06/00388 of 17 Jan. 2006 entitled "Amplificateur a entrees multiples et sorties multiples", in the corresponding international application number PCT/IB2006/003950 of 19 Dec. 2006 (WO 2007/083191) entitled "Multiple-input and multiple-output amplifier", in the French patent application number 06/05633 of 23 Jun. 2006 entitled "Amplificateur a entrees multiples et sorties multiples utilisant l'induction mutuelle dans le reseau de retroaction" and in the corresponding international application number PCT/IB2007/001344 of 26 Apr. 2007 (WO 2008/001168) entitled "Multiple-input and multiple-output amplifier using mutual induction in the feedback network".

According to the invention, the multiple-input-port and multiple-output-port amplifier may comprise a multiple-input and multiple-output series-series feedback amplifier having pseudo-differential inputs, for instance described in the French patent application number 08/03982 of 11 Jul. 2008, entitled "Amplificateur a entrees multiples et sorties multiples ayant des entrees pseudo-differentielles" and in the corresponding international application number PCT/IB2009/051358 of 31 Mar. 2009 (WO 2010/004445) entitled "Multiple-input and multiple-output amplifier having pseudo-differential inputs".

BRIEF DESCRIPTION OF THE DRAWINGS

Other advantages and characteristics will appear more clearly from the following description of particular embodiments of the invention, given by way of non-limiting examples, with reference to the accompanying drawings in which.

DETAILED DESCRIPTION OF SOME EMBODIMENTS

First Embodiment (Best Mode)

Figure 4:
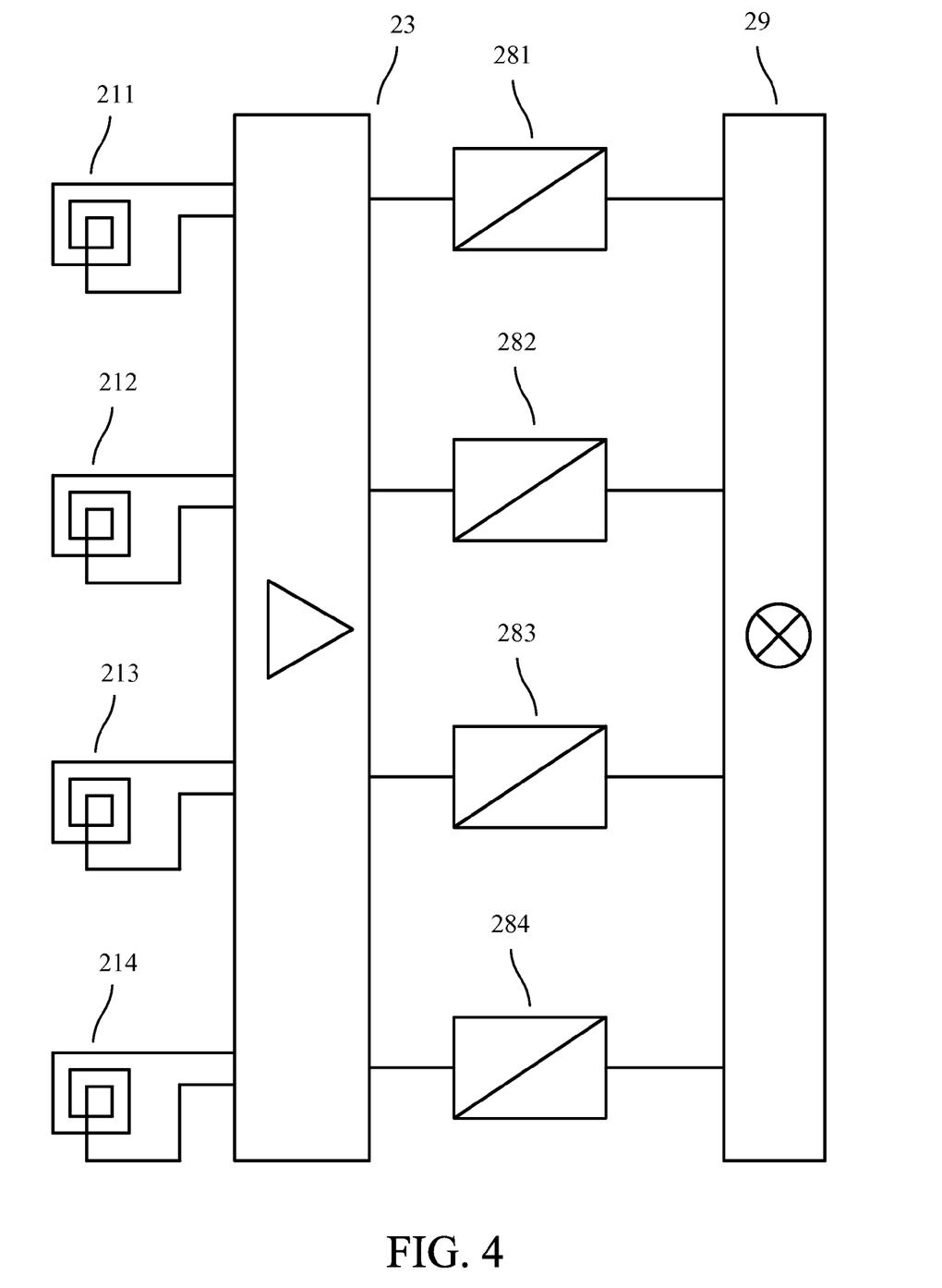
FIG. 4 shows the block diagram of a first embodiment of the invention.

As a first embodiment of a device of the invention, given by way of non-limiting example and best mode of carrying out the invention, we have represented in FIG. 4 the block diagram of a receiver for near-field chip-to-chip multichannel transmission providing m=4 transmission channels for digital transmission from a first monolithic integrated circuit to a second monolithic integrated circuit, comprising: n=4 coupling devices (211) (212) (213) (214) built in the second monolithic integrated circuit, each of said coupling devices being a planar winding sensitive to magnetic field variations; a multiple-input-port and multiple-output-port amplifier (23) built in the second monolithic integrated circuit, said multiple-input-port and multiple-output-port amplifier having n input ports and m output ports, each of said input ports being connected to one and only one of said coupling devices (211) (212) (213) (214), each of said coupling devices (211) (212) (213) (214) being connected to one and only one of said input ports, said multiple-input-port and multiple-output-port amplifier having, when said multiple-input-port and multiple-output-port amplifier is in the activated state, for small signals, at each frequency in a frequency band used for transmission, a short-circuit transfer admittance matrix, said short-circuit transfer admittance matrix being a complex matrix of size m×n, two or more entries of each row of said short-circuit transfer admittance matrix being significantly different from zero; m recovery circuits (281) (282) (283) (284), each of said recovery circuits having an input port connected to one of the output ports of the multiple-input-port and multiple-output-port amplifier (23), each of said recovery circuits having an output port connected to the user (29).

The receiver shown in FIG. 4 is a part of a near-field multichannel transmission system which also comprises a transmitter comprising n coupling devices built in the first monolithic integrated circuit, each of these coupling devices being a planar winding sensitive to magnetic field variations. All interactions between the 2n coupling devices built in the first monolithic integrated circuit and in the second monolithic integrated circuit are described by the following equations:

$$V_T = j\omega(L_T I_T - L_C I_I) + R_T I_T \tag{3}$$

$$V_I = j\omega({}^t L_C I_T - L_R I_I) - R_R I_I \tag{4}$$

where $\omega$ is the radian frequency, where $L_T$, $L_C$, $L_R$, $R_T$ and $R_R$ are square n×n real matrices, where ${}^t X$ denotes the transpose of a matrix X, where $I_T$ is the column-vector of the currents delivered by the transmitter to the coupling devices built in the first monolithic integrated circuit, where $V_T$ is the column-vector of the voltages across the coupling devices built in the first monolithic integrated circuit, and where $V_I$ and $I_I$ are defined above.

All entries of the matrices $L_T$, $L_C$ and $L_R$ have the dimensions of inductance. All entries of the matrices $R_T$ and $R_R$ have the dimensions of resistance. The first monolithic integrated circuit and the second monolithic integrated circuit being structurally combined, the specialist understands that it is possible to compute the matrices $L_T$, $L_C$, $L_R$, $R_T$ and $R_R$. In this first embodiment, the designer uses a multiple-input-port and multiple-output-port amplifier such that all entries of $Y_O$, $Y_R$ and $Y_I$ have a small absolute value in the frequency band used for transmission, so that the output currents of the multiple-input-port and multiple-output-port amplifier are approximately given by $$I_O \approx j\omega Y_T {}^t L_C I_T \tag{5}$$

The designer uses a transmitter presenting a high impedance to each of the coupling devices built in the first monolithic integrated circuit. Thus, the specialist understands that the set of the short-circuit transfer admittance matrices which can each cancel internal crosstalk at the output ports of the multiple-input-port and multiple-output-port amplifier is defined by the condition $$Y_T \approx D^t L_C^{-1} \tag{6}$$

where D is a diagonal complex matrix, D being arbitrary and possibly frequency-dependent. Thus, the designer may design a multiple-input-port and multiple-output-port amplifier such that said short-circuit transfer admittance matrix is the product of a diagonal matrix and a frequency-independent real matrix. A suitable short-circuit transfer admittance matrix may be obtained using a multiple-input and multiple-output series-series feedback amplifier or a multiple-input and multiple-output series-series feedback amplifier having pseudo-differential inputs. Thus, the multiple-input-port and multiple-output-port amplifier may use a feedback providing, at each frequency in said frequency band used for transmission, a short-circuit transfer admittance matrix such that two or more entries of each row of said short-circuit transfer admittance matrix are different from zero or significantly different from zero.

Second Embodiment

Figure 5:
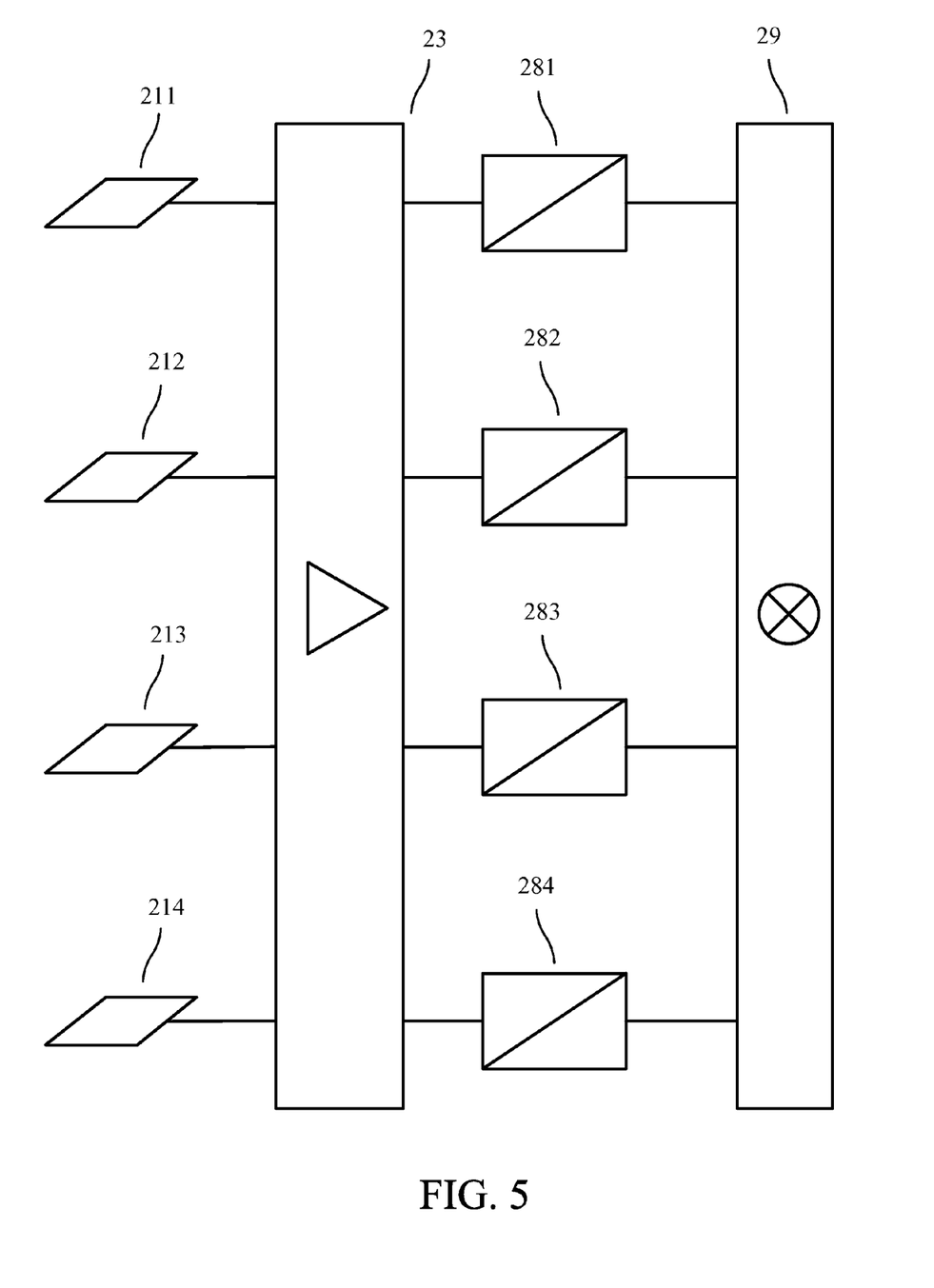
FIG. 5 shows the block diagram of a second embodiment of the invention.

As a second embodiment of a device of the invention, given by way of non-limiting example, we have represented in FIG. 5 the block diagram of a receiver for near-field chip-to-chip multichannel transmission providing m=4 transmission channels for digital transmission from a first monolithic integrated circuit to a second monolithic integrated circuit, comprising: n=4 coupling devices (211) (212) (213) (214) built in the second monolithic integrated circuit, each of said coupling devices being a conducting surface sensitive to electric field variations; a multiple-input-port and multiple-output-port amplifier (23) built in the second monolithic integrated circuit, said multiple-input-port and multiple-output-port amplifier having n input ports and m output ports, each of said input ports being connected to one and only one of said coupling devices (211) (212) (213) (214), each of said coupling devices (211) (212) (213) (214) being connected to one and only one of said input ports, said multiple-input-port and multiple-output-port amplifier having, when said multiple-input- port and multiple-output-port amplifier is in the activated state, for small signals, at each frequency in a frequency band used for transmission, a short-circuit transfer admittance matrix, said short-circuit transfer admittance matrix being a complex matrix of size m×n, two or more entries of each row of said short-circuit transfer admittance matrix being different from zero; m recovery circuits (281) (282) (283) (284), each of said recovery circuits having an input port connected to one of the output ports of the multiple-input-port and multiple-output-port amplifier (23), each of said recovery circuits having an output port connected to the user (29).

The receiver shown in FIG. 5 is a part of a near-field multichannel transmission system which also comprises a transmitter comprising n coupling devices built in the first monolithic integrated circuit, each of these coupling devices being a conducting surface sensitive to electric field variations. All interactions between the 2n coupling devices built in the first monolithic integrated circuit and in the second monolithic integrated circuit are described by the following equations $$I_T = j\omega(C_T V_T + C_C V_I) \tag{7}$$

$$-I_I = j\omega({}^t C_C V_T + C_R V_I) \tag{8}$$

where $C_T$, $C_C$ and $C_R$ are square n x n real matrices, where $I_T$ is the column-vector of the currents delivered by the transmitter to the coupling devices built in the first monolithic integrated circuit, where $V_T$ is the column-vector of the voltages across the coupling devices built in the first monolithic integrated circuit, and where $V_I$ and $I_I$ are defined above.

All entries of the matrices $C_T$, $C_C$ and $C_R$ have the dimensions of capacitance. The first monolithic integrated circuit and the second monolithic integrated circuit being structurally combined, the specialist understands that it is possible to compute the matrices $C_T$, $C_C$ and $C_R$. In this second embodiment, the designer uses a multiple-input-port and multiple-output-port amplifier such that all entries of $Y_O$, $Y_R$ and $Y_I$ have a small absolute value in the frequency band used for transmission, so that the output currents of the multiple-input-port and multiple-output-port amplifier are approximately given by $$I_O \approx -Y_T C_R^{-1} {}^t C_C V_T \tag{9}$$

The designer uses a transmitter presenting a low impedance to each of the coupling devices built in the first monolithic integrated circuit. Thus, the specialist understands that the set of the short-circuit transfer admittance matrices which can each cancel internal crosstalk at the output ports of the multiple-input-port and multiple-output-port amplifier is defined by the condition $$Y_T \approx D^t C_C^{-1} C_R \qquad (10)$$

where D is a diagonal complex matrix, D being arbitrary and possibly frequency-dependent. Thus, the designer may design a multiple-input-port and multiple-output-port amplifier such that said short-circuit transfer admittance matrix is the product of a diagonal matrix and a frequency-independent real matrix. A suitable short-circuit transfer admittance matrix may be obtained using a multiple-input and multiple-output series-series feedback amplifier or a multiple-input and multiple-output series-series feedback amplifier having pseudo-differential inputs.

Third Embodiment

A third embodiment of a device of the invention, given by way of non-limiting example, also corresponds to the block diagram of a receiver for near-field chip-to-chip multichannel transmission shown in FIG. 5. What as been said above about the second embodiment is applicable to this third embodiment except that, in this third embodiment, $Y_I$ is equal to a diagonal real matrix denoted by $G_I$ such that the absolute value of each diagonal entry of $G_I$ is much greater than the absolute values of all entries of $j\omega C_R$, in the frequency band used for transmission. This is because current-mode preamplifiers are used as input stage of the multiple-input-port and multiple-output-port amplifier. Thus, the output currents of the multiple-input-port and multiple-output-port amplifier are approximately given by $$I_O \approx -j\omega Y_T G_I^{-1} C_C V_T \qquad (11)$$

The designer uses a transmitter presenting a low impedance to each of the coupling devices built in the first monolithic integrated circuit. Thus, the specialist understands that the set of the short-circuit transfer admittance matrices which can each cancel internal crosstalk at the output ports of the multiple-input-port and multiple-output-port amplifier is defined by the condition $$Y_T \approx D^t C_C^{-1} G_I \qquad (12)$$

where D is a diagonal complex matrix, D being arbitrary and possibly frequency-dependent. Thus, the designer may design a multiple-input-port and multiple-output-port amplifier such that said short-circuit transfer admittance matrix is the product of a diagonal matrix and a frequency-independent real matrix. A suitable short-circuit transfer admittance matrix may be obtained using a multiple-input and multiple-output series-series feedback amplifier or a multiple-input and multiple-output series-series feedback amplifier having pseudo-differential inputs.

Indications on Industrial Applications

The receiver for near-field chip-to-chip multichannel transmission of the invention can be used as a receiver in the capacitive or inductive links used for vertical signal transmission between the stacked chips of a system-in-package (SiP) using three-dimensional (3-D) integration.

In the three embodiments of a device of the invention presented above, the receiver for near-field chip-to-chip multichannel transmission of the invention provides m=4 transmission channels. This is not at all a characteristic of the invention, because a receiver for near-field chip-to-chip multichannel transmission of the invention may provide a large number of transmission channels.

The receiver for near-field chip-to-chip multichannel transmission of the invention is suitable for receiving analog signals and/or digital signals. The receiver for near-field chip-to-chip multichannel transmission of the invention is suitable for receiving signals using any type of modulation.

The receiver for near-field chip-to-chip multichannel transmission of the invention has the advantage of reducing crosstalk between the transmission channels, over a wide bandwidth. The receiver for near-field chip-to-chip multichannel transmission of the invention has the advantage of increasing the number of transmission channels which may be created in a given area. The receiver for near-field chip-to-chip multichannel transmission of the invention has the advantage of increasing the transmission distance which may be obtained in a given area.

What is claimed is:

1. A receiver of a near-field multichannel transmission system providing m transmission channels each corresponding to a signal to be sent from a first monolithic integrated circuit to a second monolithic integrated circuit, where m is an integer greater than or equal to 2, the first monolithic integrated circuit and the second monolithic integrated circuit being structurally combined, the receiver comprising:

n coupling devices built in the second monolithic integrated circuit, where n is an integer greater than or equal to m; and a multiple-input-port and multiple-output-port amplifier, said multiple-input-port and multiple-output-port amplifier being built in the second monolithic integrated circuit, said multiple-input-port and multiple-output-port amplifier having n input ports and m output ports, each of said input ports being connected to one and only one of said coupling devices, each of said coupling devices being connected to one and only one of said input ports, said multiple-input-port and multiple-output-port amplifier having, when said multiple-input-port and multiple-output-port amplifier is in the activated state, for small signals, at each frequency in a frequency band used for transmission, a short-circuit transfer admittance matrix, said short-circuit transfer admittance matrix being a complex matrix of size m×n, two or more entries of each row of said short-circuit transfer admittance matrix being different from zero.

2. The receiver of claim 1, wherein one or more of said coupling devices is sensitive to electric field variations.

3. The receiver of claim 1, wherein one or more of said coupling devices is sensitive to magnetic field variations.

4. The receiver of claim 1, wherein two or more entries of each row of said short-circuit transfer admittance matrix are significantly different from zero.

5. The receiver of claim 1, wherein, at each frequency in said frequency band used for transmission, in each row of said short-circuit transfer admittance matrix, at least one entry different from an entry having the largest absolute value has an absolute value greater than $1/100$ times the absolute value of the entry having the largest absolute value.

6. The receiver of claim 1, wherein said short-circuit transfer admittance matrix is the product of a diagonal matrix and a frequency-independent real matrix.

7. The receiver of claim 1, wherein said n coupling devices are used for sending an electric field or a magnetic field, as parts of a near-field transmission system providing one or more transmission channels each corresponding to a signal to be sent from the second monolithic integrated circuit to the first monolithic integrated circuit.

8. The receiver of claim 1, wherein the multiple-input-port and multiple-output-port amplifier uses a feedback providing, at each frequency in said frequency band used for transmission, a short-circuit transfer admittance matrix such that two or more entries of each row of said short-circuit transfer admittance matrix are significantly different from zero.

9. The receiver of claim 1, wherein the multiple-input-port and multiple-output-port amplifier comprises a multiple-input and multiple-output series-series feedback amplifier.

10. The receiver of claim 1, wherein the multiple-input-port and multiple-output-port amplifier comprises a multiple-input and multiple-output series-series feedback amplifier having pseudo-differential inputs.

\* \* \* \* \*